US009008681B2

(12) United States Patent
Byun et al.

(10) Patent No.: US 9,008,681 B2
(45) Date of Patent: Apr. 14, 2015

(54) METHOD AND SYSTEM FOR CONTROLLING STATION OPERATION MODE

(75) Inventors: Hee Jung Byun, Anyang-si (KR); Mi-Sun Do, Suwon-si (KR); Jung Min So, Suwon-si (KR); Ki-Sun Oh, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2114 days.

(21) Appl. No.: 12/018,962

(22) Filed: Jan. 24, 2008

(65) Prior Publication Data
US 2009/0069028 A1 Mar. 12, 2009

(30) Foreign Application Priority Data

Sep. 7, 2007 (KR) .................. 10-2007-0090819

(51) Int. Cl.
*H04W 64/00* (2009.01)
*H04B 7/26* (2006.01)
(52) U.S. Cl.
CPC .................. *H04B 7/2606* (2013.01)
(58) Field of Classification Search
CPC ....... G01S 19/34; G01S 5/0205; G01S 19/42;
G01S 5/0036; G01S 5/0045; G01S 5/021;
G08B 13/1427; G08B 21/0283; G08B 21/023;
G08B 21/0238; H04W 52/0216; H04W
52/0229; H04W 8/005; H04W 8/08
USPC ............................... 455/456.1–457
See application file for complete search history.

(56) References Cited

U.S. PATENT DOCUMENTS

| 5,541,979 | A | * | 7/1996 | Leslie et al. | 455/436 |
| 5,657,487 | A | * | 8/1997 | Doner | 455/456.2 |
| 5,850,609 | A | * | 12/1998 | Sugarbroad et al. | 455/456.1 |
| 6,240,294 | B1 | * | 5/2001 | Hamilton et al. | 455/456.3 |
| 6,714,789 | B1 | * | 3/2004 | Oh et al. | 455/456.1 |
| 6,888,811 | B2 | * | 5/2005 | Eaton et al. | 370/338 |
| 7,092,722 | B1 | * | 8/2006 | Oh et al. | 455/456.1 |
| 7,359,715 | B2 | * | 4/2008 | Choksi | 455/456.1 |
| 2002/0082017 | A1 | * | 6/2002 | Hattori | 455/436 |
| 2002/0123352 | A1 | * | 9/2002 | Vayanos et al. | 455/456 |
| 2003/0017831 | A1 | * | 1/2003 | Lee et al. | 455/453 |
| 2004/0067759 | A1 | * | 4/2004 | Spirito et al. | 455/456.1 |
| 2004/0157561 | A1 | * | 8/2004 | Akerberg | 455/67.11 |
| 2005/0058151 | A1 | * | 3/2005 | Yeh | 370/445 |
| 2005/0059437 | A1 | * | 3/2005 | Son et al. | 455/574 |

(Continued)

FOREIGN PATENT DOCUMENTS

JP 2004-193746 7/2004
KR 10-1999-0085493 12/1999

(Continued)

*Primary Examiner* — Kashif Siddiqui
*Assistant Examiner* — Farideh Madani
(74) *Attorney, Agent, or Firm* — NSIP Law (57) ABSTRACT

A system for controlling a station operation mode is provided. The system for controlling a station operation mode, including: a distance information generation unit measuring a distance between a first communication station and a second communication station and generating distance information; a distance information comparison unit comparing the distance information and a predetermined threshold distance; and an operation mode determination unit determining any one of an active mode and an idle mode as an operation mode of the second communication station, based on a comparison result of the distance information comparison unit.

17 Claims, 4 Drawing Sheets

(56) References Cited

U.S. PATENT DOCUMENTS

| | | |
|---|---|---|
| 2005/0101333 A1* | 5/2005 | Raith .......................... 455/456.1 |
| 2005/0130677 A1* | 6/2005 | Meunier et al. ............ 455/456.6 |
| 2006/0276205 A1* | 12/2006 | Bengtsson .................... 455/457 |
| 2007/0030156 A1* | 2/2007 | Schlager et al. ........... 340/573.1 |
| 2007/0099632 A1* | 5/2007 | Choksi ........................ 455/456.1 |
| 2008/0143604 A1* | 6/2008 | Mock et al. .................. 342/450 |
| 2009/0098883 A1* | 4/2009 | Yoon .......................... 455/456.1 |
| 2009/0111468 A1* | 4/2009 | Burgess et al. ............... 455/436 |
| 2010/0105409 A1* | 4/2010 | Agarwal et al. ............ 455/456.1 |
| 2010/0130125 A1* | 5/2010 | Nurmi .......................... 455/41.1 |
| 2010/0205061 A1* | 8/2010 | Karmarkar ................. 705/14.64 |

FOREIGN PATENT DOCUMENTS

| | | |
|---|---|---|
| KR | 10-2005-0023551 A | 3/2005 |
| KR | 10-0584409 | 5/2006 |
| KR | 10-2006-0123023 | 12/2006 |
| KR | 10-2007-0039974 | 4/2007 |

* cited by examiner

METHOD AND SYSTEM FOR CONTROLLING STATION OPERATION MODE

CROSS-REFERENCE TO RELATED APPLICATION

This application claims the benefit of Korean Patent Application No. 10-2007-0090819, filed on Sep. 7, 2007, in the Korean Intellectual Property Office, the disclosure of which is incorporated herein by reference.

BACKGROUND OF THE INVENTION

1. Field of the Invention

The present invention relates to a wireless communication station, and more particularly, to a method and system for controlling a station operation mode which controls an operation of a communication station when a change of a communication station environment, for example, the communication station is deployed to a new area, occurs.

2. Description of the Related Art

Recently, much research has been conducted to provide a high-quality wireless communication service and achieve a high data transmission rate. In particular, communication service users desire to rapidly receive/transmit data via wireless communication technologies while moving.

However, a receiving terminal needs to be able to receive a transmission signal in which power is not significantly reduced in order to achieve a high data transmission rate in a wireless communication environment. For this, a number of infra-stations such as base stations, relay stations, and the like, are installed.

As the number of infra-stations increases, an interval between infra-stations gets shorter. In this instance, all infra-stations are enabled, and an interference between adjacent infra-stations can be generated.

Also, since service areas of adjacent infra-stations can be overlapped, wireless resources can be excessively wasted.

A power-off method exists for preventing service areas of adjacent infra-stations from being overlapped. In the method, any one of the adjacent infra-stations is turned off. However, when any one of the adjacent infra-stations is turned off, it takes a long time for the powered-off infra-station to perform an initial setup, and wireless resources can be wasted.

Accordingly, a method and system for controlling a station operation mode which can determine operation modes of infra-stations and reduce a waste of wireless resource is needed to be applicable to an actual wireless environment and provide a user with a high-quality communication service.

BRIEF SUMMARY

Aspects of the present invention provide a method and system for controlling a station operation mode which compares a distance between a first communication station and a second communication station with a predetermined threshold distance, determines an operation mode of the second communication station, and can thereby determine an operation mode more appropriately.

Aspects of the present invention also provide a method and system for controlling a station operation mode which uses an idle mode in which a power and an initial environment setting of a second communication station are maintained and a communication operation of the second communication station is paused, and can thereby significantly reduce a waste of wireless resource and rapidly set up the second communication station.

Aspects of the present invention also provide a method and system for controlling a station operation mode which determines an operation mode of a second communication station by considering whether a service area of a first communication station is capable of including a service area of the second communication station, and can thereby provide a communication service more efficiently.

Aspects of the present invention also provide a method and system for controlling a station operation mode which determines an operation mode of a second communication station by considering an available power of a first communication station, and can thereby provide a more stable communication service.

Aspects of the present invention also provide a method and system for controlling a station operation mode which determines an operation mode of a second communication station by using at least one of a first traffic load, generated in a service area of a first communication station, and a second traffic load, generated in a service area of the second communication station, and can thereby use a limited wireless resource more efficiently.

According to an aspect of the present invention, there is provided a system for controlling a station operation mode, including: a distance information generation unit measuring a distance between a first communication station and a second communication station and generating distance information; a distance information comparison unit comparing the distance information and a predetermined threshold distance; and an operation mode determination unit determining any one of an active mode and an idle mode as an operation mode of the second communication station, based on a comparison result of the distance information comparison unit.

The operation mode determination unit can determine the operation mode of the second communication station by considering whether a service area of the first communication station is capable of including a service area of the second communication station.

The operation mode determination unit can determine the operation mode of the second communication station by considering an available power of the first communication station.

The operation mode determination unit can determine the operation mode of the second communication station by considering at least one of a first traffic load, generated in a service area of the first communication station, and a second traffic load generated in a service area of the second communication station.

The system for controlling a station operation mode can further include a mode information transfer unit transferring mode information associated with the determined operation mode to the second communication station.

According to an aspect of the present invention, there is provided a method of controlling a station operation mode, including: measuring a distance between a first communication station and a second communication station and generating distance information; comparing the distance information and a predetermined threshold distance; and determining any one of an active mode and an idle mode as an operation mode of the second communication station, based on a comparison result of the distance information and the threshold distance.

BRIEF DESCRIPTION OF THE DRAWINGS

The above and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
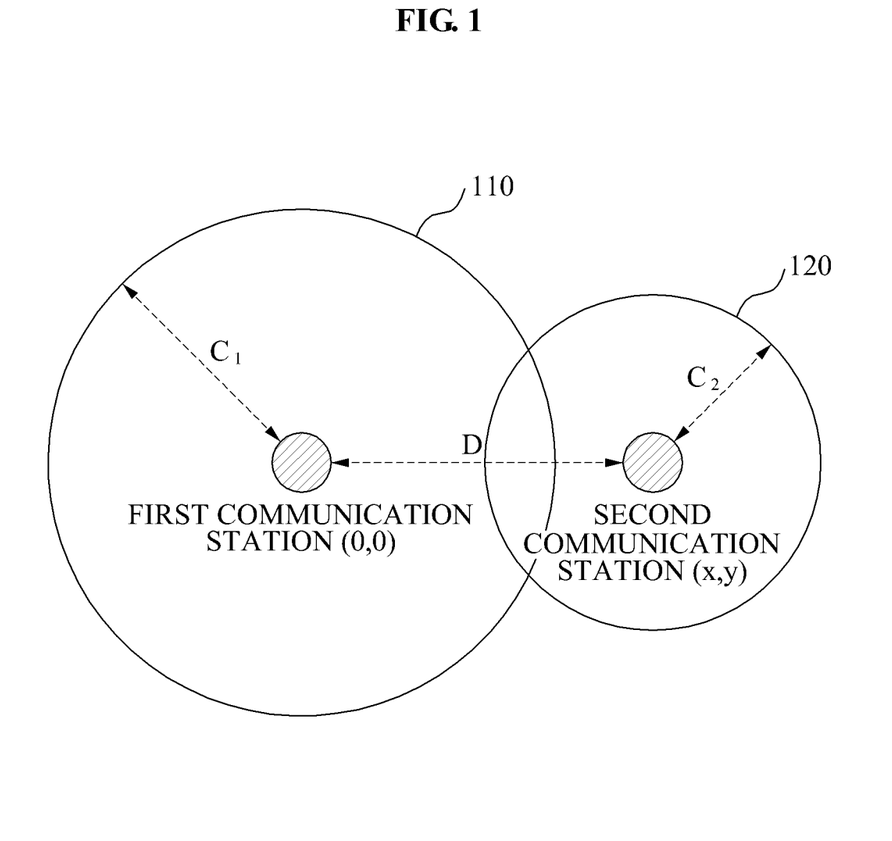
FIG. 1 is a diagram illustrating an example of a service area of a first communication station and a service area of a second communication station when the first communication station is located at a point (0, 0) and the second communication station is located at a point (x, y)

FIG. 1 is a diagram illustrating an example of a service area of a first communication station and a service area of a second communication station when the first communication station is located at a point (0, 0) and the second communication station is located at a point (x, Y).

Referring to FIG. 1, the service area of the first communication station 110 when the first communication station is located at the point (0, 0) and the service area of the second communication station 120 when the second communication station is located at the point (x, y) are illustrated in FIG. 1.

A variety of communication stations exist. For example, a communication station can include a base station, a relay station, a terminal, and the like.

Also, the communication station can have mobility and include any type of apparatus having cell coverage or a service area of the communication station.

A radius of the service area of the first communication station 110 is $C_1$, and a radius of the service area of the second communication station 120 is $C_2$. Also, a distance between the first communication station and the second communication station is D.

In FIG. 1, an area where the service area of the first communication station 110 and the service area of the second communication station 120 are overlapped exists. However, when the second communication station has mobility, the second communication station may move further away from the first communication station. Accordingly, the distance D can vary, and the service area of the first communication station 110 and the service area of the second communication station 120 may not be overlapped.

Generally, when the service area of the first communication station 110 and the service area of the second communication station 120 are not overlapped, it is preferable that both the first communication station 110 and the second communication station 120 are activated, since each of the first communication station 110 and the second communication station 120 has their own respective service area, and an interference between the first communication station 110 and the second communication station 120 is insignificant.

However, when an unusual situation occurs, for example, a user, a terminal, and the like, included in the service area of the communication station, do not exist, the communication station can become idle.

Figure 2:
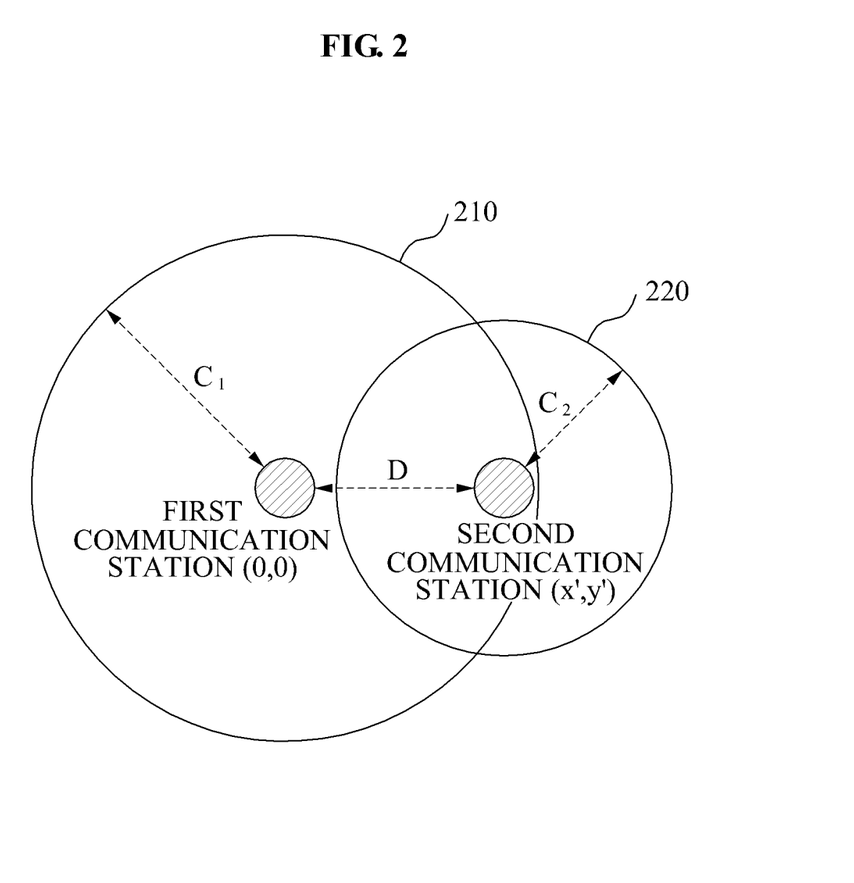
FIG. 2 is a diagram illustrating an example of a service area of a first communication station and a service area of a second communication station when the first communication station is located at a point (0, 0) and the second communication station is located at a point (x', y')

FIG. 2 is a diagram illustrating an example of a service area of a first communication station 210 and a service area of a second communication station 220 when the first communication station is located at a point (0, 0) and the second communication station is located at a point (x', y').

Referring to FIG. 2, the service area of the first communication station 210 when the first communication station is located at the point (0, 0) and the service area of the second communication station 220 when the second communication station is located at the point (x', y') are illustrated in FIG. 2.

When comparing FIG. 2 to FIG. 1, an area where the service area of the first communication station 210 and the service area of the second communication station 220 are overlapped is larger than an area where a service area of a first communication station 110 and a service area of a second communication station 120 are overlapped. Specifically, a distance between the first communication station and the second communication station, D, in FIG. 2 is less than a distance between the first communication station and the second communication station, D, in FIG. 1, and thus the area where the service area of the first communication station 210 and the service area of the second communication station 220 are overlapped is larger than the overlapped area in FIG. 1.

When a user terminal exists in the overlapped area in FIG. 2, an interference generated between the first communication station and the second communication station can have a detrimental effect on a communication performance of the user terminal.

Also, when the user terminal exists in the overlapped area of the service area of both the first and second communication station 210 and 220, making the second, making the second communication station idle can be more efficient.

Figure 3:
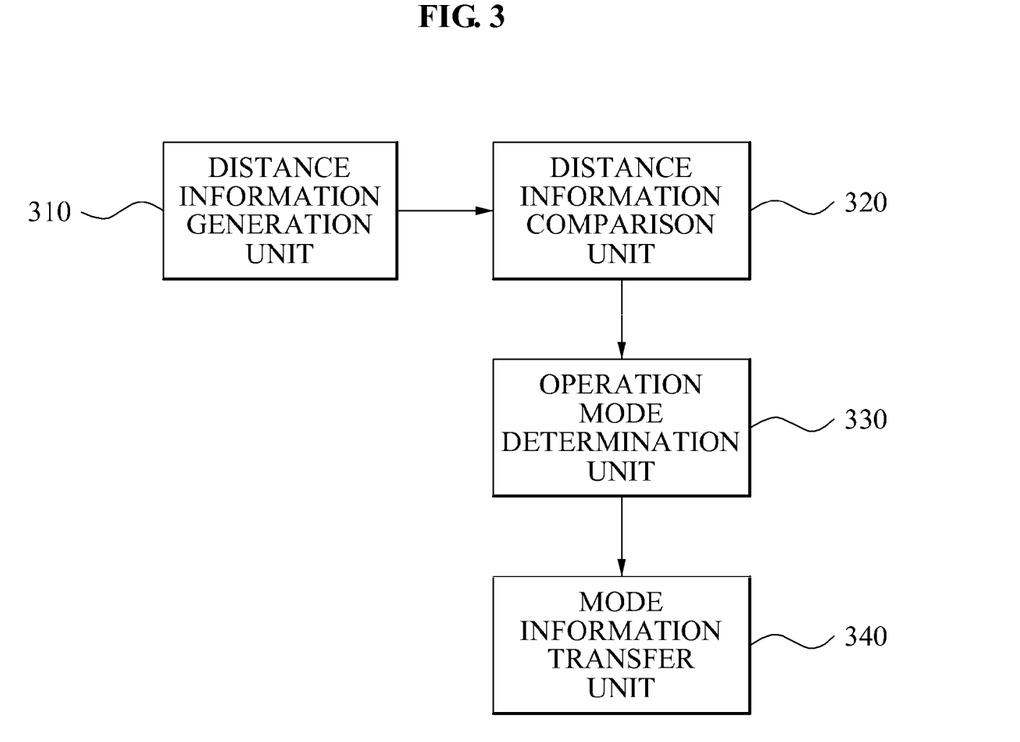
FIG. 3 is a block diagram illustrating a system for controlling a station operation mode according to an embodiment of the present invention.

FIG. 3 is a block diagram illustrating a system for controlling a station operation mode according to an embodiment of the present invention.

Referring to FIG. 3, the system for controlling a station operation mode includes a distance information generation unit 310, a distance information comparison unit 320, an operation mode determination unit 330, and a mode information transfer unit 340.

The distance information generation unit 310 measures a distance between a first communication station and a second communication station, and generates distance information.

The distance information generation unit 310 can generate the distance information using various distance measurement algorithms. For example, the distance information can be generated based on coordinates of the first communication station and the second communication station. Also, the distance information can be generated based on an arrival time of a signal, and the like.

Also, the distance information comparison unit 320 compares the distance information and a predetermined threshold distance.

The predetermined threshold distance can be predetermined by considering a radius of a service area of a first communication station and a radius of a service area of a second communication station.

It is assumed that the radius of the service area of the first communication station is $C_1$, the radius of the service area of the second communication station is $C_2$, and $C_2$ is less than $C_1$. The predetermined threshold distance, $D_{th}$, can be represented as Equation 1:

$$D_{th} = \max(C_1, C_2) \cdot (1-w) \quad \text{[Equation 1]}$$

where w is a real number, and $0 \leq W \leq 1$.

Referring again to FIG. 1, a distance between a first communication station and a second communication station, D, can be greater than $C_1$. A range of the distance D can be represented as Equation 2.

$$D \geq C_1 \geq D_{th} = \max(C_1, C_2) \cdot (1-w) \quad \text{[Equation 2]}$$

Referring to Equation 2, when the first communication station and the second communication station are located as illustrated in FIG. 1, the distance information comparison unit 320 compares distance information D and a threshold distance $D_{th}$. In this case, the distance information D is determined to be greater than the threshold distance $D_{th}$.

Referring again to FIG. 2, as opposed to FIG. 1, a distance between the first communication station and the second communication station, D, is less than $C_1$. The distance information comparison unit 320 compares the distance information D and the threshold distance $D_{th}$. In this case, a comparison result varies depending on a value of w.

Accordingly, when the value of w is determined to be a relatively small value, it can be determined that the distance information D is less than the threshold distance $D_{th}$. When the value of w is determined to be a relatively great value, it can be determined that the distance information D is greater than the threshold distance $D_{th}$.

Also, the operation mode determination unit 330 determines any one of an active mode and an idle mode as an operation mode of the second communication station, based on the comparison result of the distance information comparison unit 320.

The operation mode determination unit 330 determines the active mode as the operation mode of the second communication station when the distance information is greater than or equal to the threshold distance. Also, when the distance information is less than the threshold distance, the operation mode determination unit 330 determines the idle mode as the operation mode of the second communication station.

In the idle mode, a power and an initial environment setting of the second communication station can be maintained and a communication operation of the second communication station can be paused.

Specifically, when the active mode is determined as the operation mode of the second communication station, the second communication station normally performs the communication operation in a power-on state. For example, when the second communication station is a relay station, the second communication station normally relays a signal.

However, when the idle mode is determined as the operation mode of the second communication station, the second communication station may not normally perform the communication operation. However, even when the idle mode is determined as the operation mode of the second communication station, the second communication station is not powered off, and environment setting information, and the like, predetermined in the second communication station, may not be reset or initialized.

Thus, according to aspects of the present invention, a waste of communication resource can be reduced by using the idle mode, and an initial setup operation due to a power-off when the second communication station is needed to normally perform the communication operation again can be reduced.

The operation mode determination unit 330 can determine the operation mode of the second communication station by considering whether a service area of the first communication station is capable of including a service area of the second communication station.

For example, it is assumed that a user terminal A and a user terminal B are included in the service area of the second communication station. The operation mode determination unit 330 can determine whether the user terminal A and the user terminal B are included within a maximum serviceable area of the first communication station.

Alternatively, a signal to interference and noise ratio (SINR), a carrier to interference and noise ratio (CINR), and the like can be used as criteria of the determination.

When it is determined that the user terminal A and the user terminal B are included in the maximum serviceable area of the first communication station, the operation mode determination unit 330 can determine the idle mode as the operation mode of the second communication station.

However, when the maximum serviceable area of the first communication station includes the user terminal A, not the user terminal B, the operation mode determination unit 330 can determine the active mode as the operation mode of the second communication station. Even in this case, however, when it is determined that the user terminal B does not perform the communication operation, for example, a power-off state, the operation mode determination unit 330 can determine the idle mode as the operation mode of the second communication station.

The operation mode determination unit 330 can determine the operation mode of the second communication station by considering an available power of the first communication station.

For example, although the user terminal A and the user terminal B are included in the service area of the first communication station, the operation mode determination unit 330 can further consider the available power of the first communication station.

When the operation mode of the second communication station is determined as the idle mode, and the first communication station communicates with both the user terminal A and the user terminal B, the first communication station consumes more power than the previous example. Accordingly, when the available power of the first communication station is not considered in determining the operation mode of the second communication station, a stability of the first communication station can be adversely affected.

Accordingly, the operation mode determination unit 330 can determine the operation mode of the second communication station by considering whether the first communication station can stably perform the communication operation even when the first communication station communicates with both the user terminal A and the user terminal B.

Also, the operation mode determination unit 330 can determine the operation mode of the second communication station by considering at least one of a first traffic load and a second traffic load. The first traffic load is generated in a service area of the first communication station, and the second traffic load is generated in a service area of the second communication station.

For example, it is assumed that the first traffic load is 50, and the second traffic load is 30. In this instance, it is assumed that a threshold traffic load, which is applied to the first communication station for a stable operation of the first communication station, is 60. When the idle mode is determined as the operation mode of the second communication station, a total traffic load of 50+30=80 is generated in the first communication station, which is greater than the threshold traffic load, 60. Accordingly, the operation mode determination unit 330 can determine the active mode as the operation mode of the second communication station.

However, when the threshold traffic load is 100, the operation mode determination unit 330 can determine the idle mode as the operation mode of the second communication station.

Also, the mode information transfer unit 340 transfers mode information associated with the determined operation mode to the second communication station.

The system for controlling a station operation mode can be installed in the first communication station, another communication station, as well as any type of communication apparatus which is different from a communication station.

When the system for controlling a station operation mode is installed in another place excluding the second communication station, the second communication station receives mode information associated with the determined operation mode, and performs the communication operation according to the determined operation mode.

For example, it is assumed the operation mode is determined as the idle mode, and the mode information includes information associated with the idle mode. In this case, the second communication station performs in the idle mode. Accordingly, the second communication station can maintain the power and the initial environment setting and is not capable of performing the communication operation.

Figure 4:
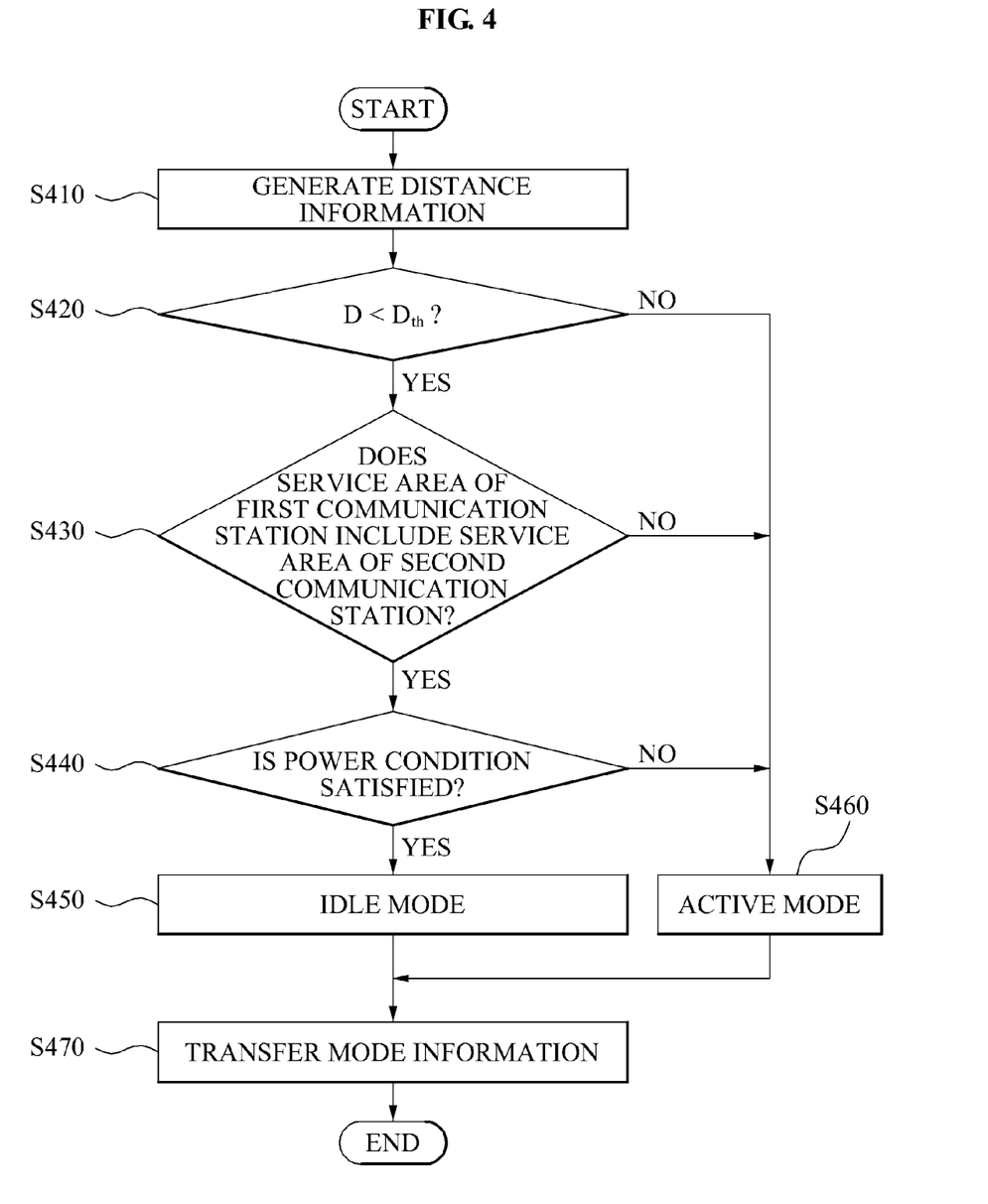
FIG. 4 is a flowchart illustrating a method of controlling a station operation mode according to an embodiment of the present invention.

FIG. 4 is a flowchart illustrating a method of controlling a station operation mode according to an embodiment of the present invention.

Referring to FIG. 4, in operation S410, the method of controlling a station operation mode measures a distance between a first communication station and a second communication station and generates distance information D.

In operation S420, the method of controlling a station operation mode compares the distance information D and a predetermined threshold distance $D_{th}$.

The threshold distance $D_{th}$ can be predetermined by considering a radius of a service area of the first communication station and a radius of a service area of the second communication station.

Also, the method of controlling a station operation mode can determine any one of an idle mode and an active mode as the operation mode of the second communication station, based on the comparison result.

In the idle mode, a power and an initial environment setting of the second communication station are maintained while a communication operation of the second communication station is paused.

In operation S430, when the distance information D is determined to be less than the predetermined threshold distance $D_{th}$, the method of controlling a station operation mode determines the operation mode of the second communication station by considering whether a service area of the first communication station includes a service area of the second communication station.

When the distance information D is determined to be greater than or equal to the predetermined threshold distance $D_{th}$ in operation S420, the method of controlling a station operation mode determines the active mode as the operation mode of the second communication station in operation S460.

When the service area of the first communication is determined to be included in the service area of the second communication system in operation S430, the method of controlling a station operation mode determines the operation mode of the second communication station by considering an available power of the first communication station in operation S440.

For example, when the idle mode is determined as the operation mode of the second communication station, and it is determined that the available power of the first communication station is insufficient in operation S440, the active mode can be determined as the operation mode of the second communication station in operation S460.

Conversely, when the idle mode is determined as the operation mode of the second communication station, and it is determined that the available power of the first communication station is sufficient in operation S440, the idle mode can be determined as the operation mode of the second communication station in operation S450.

Also, although it is not illustrated in FIG. 4, the method of controlling a station operation mode can further include an operation of determining the operation mode of the second communication station by considering at least one of a first traffic load and a second traffic load. The first traffic load is generated in a service area of the first communication station, and the second traffic load is generated in a service area of the second communication station.

In operation S470, the method of controlling a station operation mode transfers mode information associated with the determined operation mode to the second communication station.

The above-described embodiment of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to aspects of the present invention, a method and system for controlling a station operation mode compares a distance between a first communication station and a second communication station with a predetermined threshold distance, determines an operation mode of the second communication station, and can thereby determine an operation mode more appropriately.

According to aspects of the present invention, a method and system for controlling a station operation mode uses an idle mode in which a power and an initial environment setting of a second communication station are maintained and a communication operation of the second communication station is paused, and can thereby significantly reduce a waste of wireless resource and rapidly set up the second communication station.

According to aspects of the present invention, a method and system for controlling a station operation mode determines an operation mode of a second communication station by considering whether a service area of a first communication station is capable of including a service area of the second communication station, and can thereby provide a communication service more efficiently.

According to aspects of the present invention, a method and system for controlling a station operation mode determines an operation mode of a second communication station by considering an available power of a first communication station, and can thereby provide a more stable communication service.

According to aspects of the present invention, a method and system for controlling a station operation mode determines an operation mode of a second communication station by using at least one of a first traffic load, generated in a service area of a first communication station, and a second traffic load, generated in a service area of the second communication station, and can thereby use a limited wireless resource more efficiently.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A non-transitory system for controlling a station operational mode, the system comprising:
    a distance information generation unit configured to:
        measure a distance between a first communication station and a second communication station; and
        generate distance information using the measured distance;
    a distance information comparison unit configured to compare the generated distance information with a predetermined threshold distance; and
    an operation mode determination unit configured to determine an operational mode of the second communication station based the comparison and a determination of whether the first communication station is located close enough to a user terminal, currently being provided communication service by the second communication station, so as to provide communication service for the user terminal, wherein
    the determined operational mode is an active operational mode or an idle operational mode.

2. The system of claim 1, wherein the operation mode determination unit is further configured to consider an available power of the first communication station when determining the operational mode of the second communication station.

3. The system of claim 1, wherein the operation mode determination unit is further configured to consider, when determining the operational mode of the second communication station, at least one of a first traffic load and a second traffic load, the first traffic load being generated in a service area of the first communication station, and the second traffic load being generated in a service area of the second communication station.

4. The system of claim 1, wherein the operation mode determination unit is further configured to:
    determine the operational mode of the second communication station as the active mode when the generated distance information is greater than or equal to the predetermined threshold distance; and
    determine the operational mode of the second communication station as the idle mode when the generated distance information is less than the predetermined threshold distance and the first communication station is located close enough to the user terminal to provide communication service for the user terminal.

5. The system of claim 1, wherein the predetermined threshold distance is determined by considering a radius of a communication service area provided by the first communication station to a first user terminal and a radius of a communication service area provided by of the second communication station to a second user terminal.

6. The system of claim 1, wherein, in the idle mode, a power setting and an initial environment setting of the second communication station are maintained and a communication operation of the second communication station is paused.

7. The system of claim 1, further comprising a mode information transfer unit configured to transfer mode information associated with the determined operational mode to the second communication station.

8. A method of controlling a station operational mode, the method comprising:
    measuring a distance between a first communication station and a second communication station;
    generating distance information using the measured distance;
    comparing the generated distance information with a predetermined threshold distance; and
    determining, for the second communication station, an operational mode based upon the comparison and a determination of whether the first communication terminal is located close enough to a user terminal, currently being provided communication service by the second communication station, so as to provide communication service for the user terminal, wherein
    the determined operational mode is an active operational mode or an idle operational mode.

9. The method of claim 8, wherein determining the operational mode of the second communication station comprises considering an available power of the first communication station.

10. The method of claim 8, wherein determining the operational mode of the second communication station comprises considering at least one of a first traffic load and a second traffic load, the first traffic load being generated in a service area of the first communication station, and the second traffic load being generated in a service area of the second communication station.

11. The method of claim 8, wherein determining the operational mode of the second communication station comprises:
    determining the active mode as the operational mode of the second communication station when the generated distance information is greater than or equal to the predetermined threshold distance; and
    determining the idle mode as the operational mode of the second communication station when the generated distance information is less than the predetermined threshold distance and the first communication station is located close enough to the user terminal to provide communication service for the user terminal.

12. The method of claim 8, wherein, when the second communication station is in the idle mode, a power setting and an initial environment setting of the second communication station are maintained and a communication operation of the second communication station is paused.

13. The method of claim 8, further comprising transferring mode information associated with the determined operational mode to the second communication station.

14. A non-transitory computer-readable recording medium storing a program that, when executed by a processor, causes the processor to implement a method of controlling a station operational mode, the method comprising:

measuring a distance between a first communication station and a second communication station;

generating distance information using the measured distance;

comparing the generated distance information with a predetermined threshold distance; and determining, for the second communication station, an operational mode based upon the comparison and a determination of whether the first communication terminal is located close enough to a user terminal, currently being provided communication service by the second communication station, so as to provide communication service for the user terminal, wherein the determined operational mode is an active operational mode or an idle operational mode.

15. The system according to claim 1, wherein $$D_{th} = \max(C_1, C_2) \cdot (1-w),$$

where $D_{th}$ is the predetermined threshold distance, $C_1$ is a radius of a service area of the first communication station, $C_2$ is a radius of a service area of the second communication station, $C_2$ is less than $C_1$, w is a real number, and $0 \leq w \leq 1$.

16. The system according to claim 4, wherein $$D_{th} = \max(C_1, C_2) \cdot (1-w),$$

where $D_{th}$ is the predetermined threshold distance, $C_1$ is a radius of a service area of the first communication station, $C_2$ is a radius of a service area of the second communication station, $C_2$ is less than $C_1$, w is a real number, and $0 \leq w \leq 1$.

17. The system according to claim 5, wherein $$D_{th} = \max(C_1, C_2) \cdot (1-w),$$

where $D_{th}$ is the predetermined threshold distance, $C_1$ is the radius of the service area of the first communication station, $C_2$ is the radius of the service area of the second communication station, $C_2$ is less than $C_1$, w is a real number, and $0 \leq w \leq 1$.

* * * * *